Jan. 7, 1936.   J. S. SCHUMAKER ET AL   2,026,999
DRIVING MECHANISM
Filed May 16, 1934   2 Sheets-Sheet 2
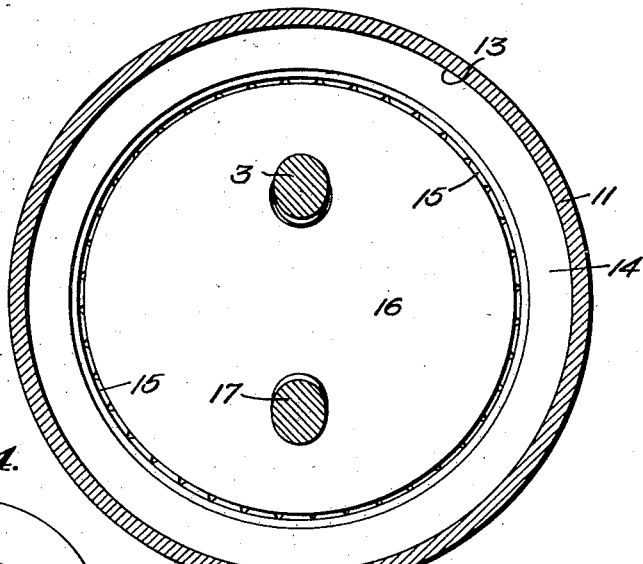
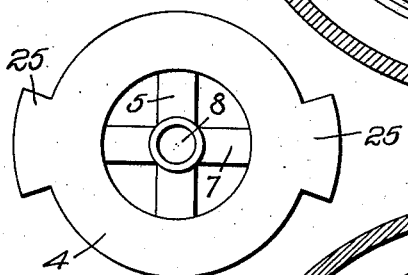
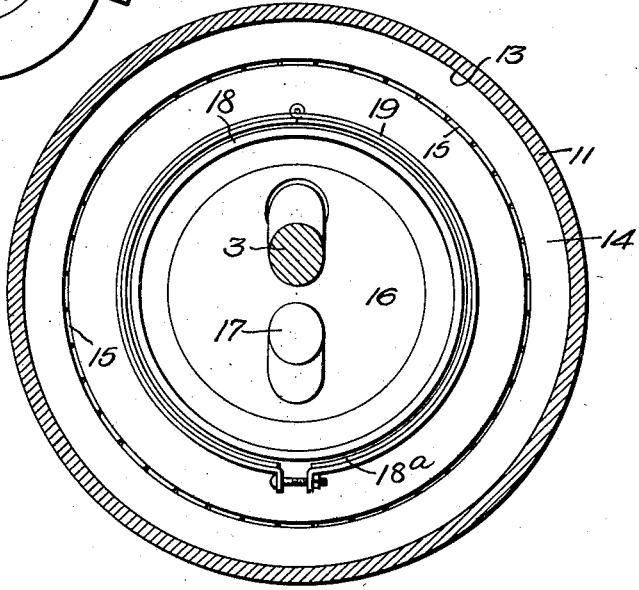

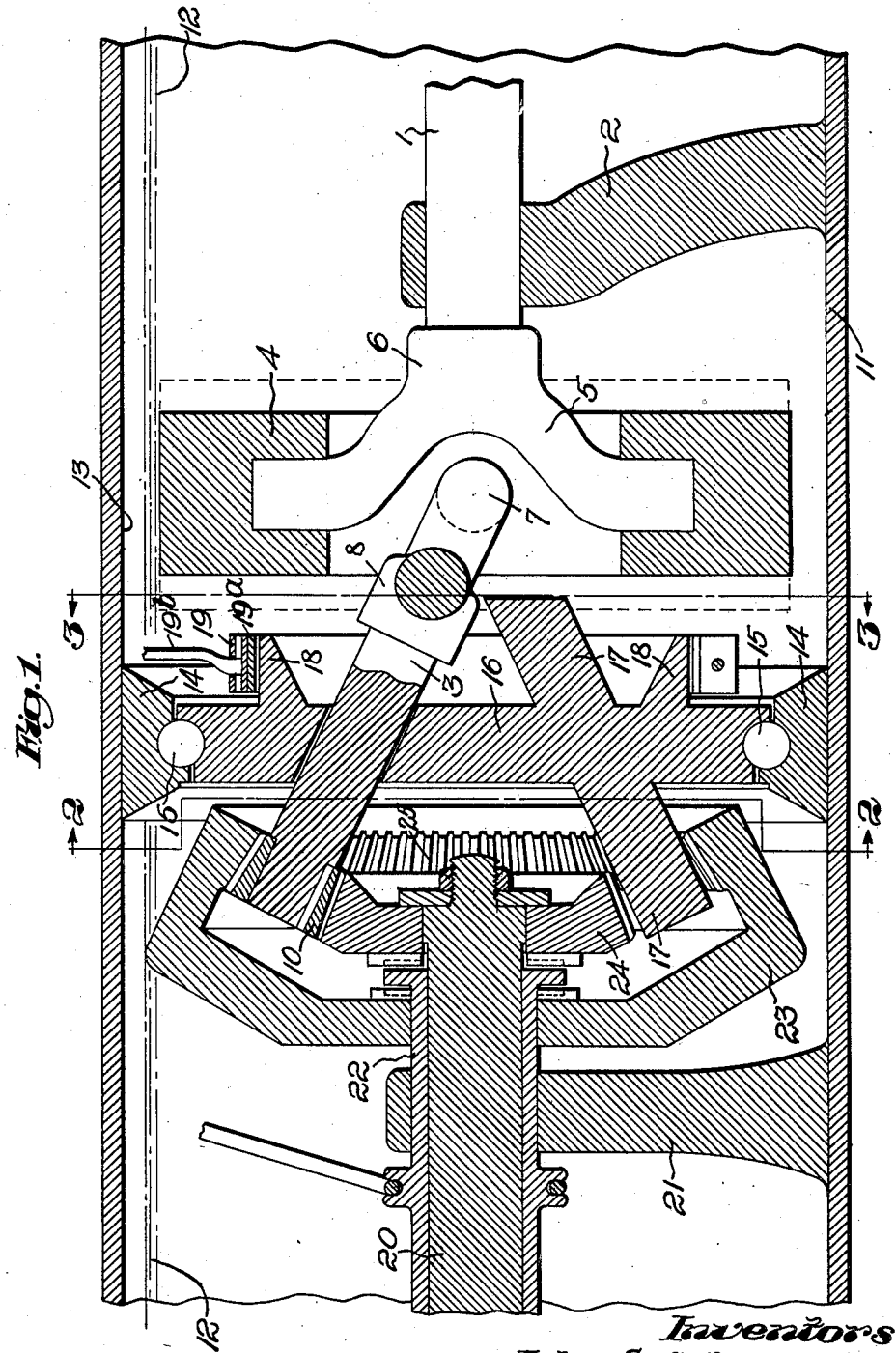

Patented Jan. 7, 1936

2,026,999

UNITED STATES PATENT OFFICE 2,026,999

DRIVING MECHANISM

John S. Schumaker and Alan G. Schumaker, Asheville, N. C.

Application May 16, 1934, Serial No. 725,944

16 Claims. (Cl. 74—259)

This invention relates to a novel and improved driving mechanism for any purpose for which it may be found adapted, and it is especially useful in cases where variable-speed power transmission is desired, without the necessity of using a gear shift or its equivalent.

By our invention, the desired result may be had automatically, by using suitable connecting mechanism between the driving and driven shafts, or the like, for utilizing the centrifugal force resident in a varying degree in a rotating element as part of the connecting mechanism and of suitable weight, proportion and form to control the rotation of the driven shaft, which rotating element, as shown herein, may be, broadly, a universal joint. Our invention may be advantageously used in connection with the motor of an automobile and the like, for instance, to avoid the clutch-shifting operation now generally used, and its attendant difficulties and objectionable characteristics.

In the drawings of one embodiment of our invention described and illustrated herein:

Fig. 1 is a vertical, longitudinal section, parts being broken away for convenience;

Fig. 2 is a vertical, cross-section on the line 2—2 from the left, Fig. 1;

Fig. 3 is a simiar view on the line 3—3 of Fig. 1, from the right; and

Fig. 4 a modified form of construction of the illustrated form of a universal joint which may be used.

Referring first to Fig. 1, our novel drive mechanism comprises a drive shaft 1, driven by any convenient and suitable means, as a motor, not shown, with a conventional bearing 2 therefor. The shaft 1 is operatively connected to a driven shaft 20 by a novel mechanism automatically responsive to the speed of the driving means, said novel mechanism herein including not only one form of a universal joint, but also elements connecting it to the driven shaft for utilizing the centrifugal force resident in the universal joint and connections as a controlling means to vary the speed of the driven shaft.

Herein, the shaft 1 carries, Fig. 1, as a part of a means to create the centrifugal force and as a part of the universal joint, a ring 4 of suitable weight mounted pivotally at diametrically opposite circumferential points upon arms 5 of a hub 6 on the shaft 1; and pivotally mounted within and on the ring 4 at right angles to the arms 5 are similar members 7 on a hub 8, with an auxiliary drive shaft 3 secured therein and with a driving pinion 10 fixedly secured to the outer end of the shaft 3.

It is one object, as stated, to provide a construction that will act, in operation, as a suitable control for the action or influence of the centrifugal force above referred to. This force is, of course, developed in each rotating element, as the ring 4 or arms 5, 7, in proportion to its mass or weight, speed of rotation and distance from the axis of the rotating element. This ring 4 preferably may, therefore, be conveniently constructed of sufficient weight and such form as to make it resemble a fly-wheel in appearance. By so doing, and pivotally mounting it upon the arms 5, the ring and joint can be more easily and effectively loaded to the desired extent, and with the weight in the position where it will most effectively and conveniently create centrifugal force to control the auxiliary and driven shafts.

The present embodiment of our invention, as described, Fig. 1, is mounted and runs in a housing 11 containing a suitable quantity of oil or other lubricant 12, and, at a suitable point on the inner wall 13 of the housing, the latter is provided with a flange or rib 14 having ball-bearings 15 therein. On these bearings is mounted a disk 16, Figs. 1, 2, 3, drilled to receive and serve as a bearing for an extension or auxiliary drive shaft 3, and the disk rotates therewith during any movement of the shaft, except movement of it about its own axis.

To balance this movement of the bearing disk with the shaft 3, the disk, Figs. 1, 2, 3, is provided on one or both faces with suitable balancing means, as ribs 17. The disk, Fig. 3, also has on one face for control purposes, as will be explained later, a flange 18, on which acts a brake shoe 19, with suitable frictional material 19a thereon, actuated by any suitable means, as a rod 19b, shown broken off for convenience.

The driven shaft 20, Fig. 1, is mounted in a suitable bearing, as 21. Lockable on the shaft, in this case by any suitable means, as by the clutch 22, is a loose gear 23, herein of the internal bevel type, which meshes with the pinion 10 on the shaft 3. On the end of the shaft 20 is also a bevel reversing gear 24, which may be locked to the shaft by the clutch 22 in place of the gear 23, when desired, for reverse rotation of the shaft 20. The gear 24 is shown held in position on the shaft as by a nut 25 threaded thereon.

Obviously, the arms 5 will always, and, under the influence of centrifugal force, the ring 4 would normally tend to, rotate in a plane at right angles to the driving shaft. The arms 7, however, pivoted in the ring 4 and to which the shaft 3 is secured and in an angular relation to shaft 1, will, as the shaft 3 swings about the axis of the shaft 20, unless the latter is rotating uniformly with shaft 1, cause alternate swivelling of the ring 4 on the arms 5, once to each side of the normal plane of rotation of the arms 5, see dotted lines Fig. 1, during a complete revolution of the ring 4, relative to the driven shaft 20, as in the case of the usual universal joint. The outer ends of arms 7 during the swivelling of the ring 4 will move alternately in two paths at an angle to each other, and, as stated, to the plane of rotation of arms 5. These paths of the arms 7 will cross the path of rotation of arms 5, and form, during one revolution relative to the driven shaft 20 of ring 4, two V-shaped tracks positioned alternately on the opposite sides of the path or plane of rotation of the arms 5, and pointed away from said path of arms 5.

Obviously, as stated, there is created in the ring 4 in proportion to its speed a centrifugal force with at least two tendencies or influences exerted at different times during rotation of the ring 4:—first, the influence tending always to cause ring 4 to rotate in a position at right angles to shaft 1 and oppose the tendency of arms 7 to swivel the ring 4 about arms 5. This influence is operative during what may be called period A,— while the arms 7 are moving away from the path of rotation of the arms 5,—to offset this tendency of arms 7 and force shaft 3 to rotate as a crank about shaft 20, to which shaft 3 is connected by gear 23, and the amount of this influence increases with the increased deflection of the ring 4 from a position at right angles to shaft 1. The second influence is that of the centrifugal force tending always to cause ring 4 to rotate in a position at right angles to shaft 1, during, say, period B,—the time when the arms 7 are traveling toward the path of rotation of the arms 5, and tending to help the motion of arms 7, but which is not helpful operatively as it tends to assist shaft 3 to rotate on its own axis.

It is known as pointed out, that the amount of centrifugal force created in any rotating body depends upon the mass, R. P. M. and distance from the center of rotation of the body, and that the amount of centrifugal force created by the different portions of the body varies in a constantly decreasing degree, other things being equal, with the decrease in its distance from the center of rotation.

The above influences of the centrifugal force during periods A and B in a properly proportioned unit are negligible at low R. P. M., but mount rapidly in effectiveness with the increase in R. P. M. Influence A, as it may be called, is relied upon primarily herein for our driving control.

When the centrifugal force influence A is sufficient to prevent ring 4 from swivelling on the axis of arms 5 and the arms 7 from turning on their axes in the ring 4, then shaft 3 cannot rotate on its own axis, but, with the continued rotation of shaft 1, shaft 3 must swing as a crank, so to speak, around the axis of shaft 1 and shaft 20. As gear 23 and pinion 10 are meshed, then gear 23 and shaft 20 must rotate with shaft 1 at a ratio of 1 to 1.

If the centrifugal influence in ring 4 is not sufficient to prevent the free swivelling of arms 7 and ring 4 about arms 5 to some extent, but simply to retard it, then a composite motion is set up in shaft 3 consisting, first, of rotation about its own axis, but not with a revolution for each revolution of the shaft 1, because of the resistance of the centrifugal influence to the tilting of arms 7, the difference in revolutions being made up by shaft 3 turning as a crank about the axes of shafts 1 and 20, as the second form of the composite motion. This condition will constitute the equivalent of some gear ratio greater than 1 to 1, say 2 to 1, and will depend upon the amount of the centrifugal force in ring 4 in relation to the inertia or load on gear 23, tending to prevent gear 23 from turning.

With a relatively high R. P. M. of shaft 1, say 700, a strong centrifugal influence during period A, or influence A, will be created, and the load at gear 23 being light, then shaft 3 with the gear 10 will rotate as a crank, as described, about the axis of shaft 20; but if, then, this load at gear 23 is increased, the relative speed of gear 23 will decrease to a ratio of, say, 2 to 1 by shaft 3 simultaneously rotating about its own axis and as a crank about the axis of shaft 20.

The brake 19 is seldom or never used to effect any intermediary motion at the bearing disk 16. It is generally either off completely, or on sufficiently to stop rotation of disk 16. When it is on and gear 23 is locked to shaft 20, the disk permits only one motion of shaft 3, viz: about its own axis, and so a definite high gear ratio dependent on all conditions is established between shaft 1 and shaft 20 for clockwise rotation; and when gear 24 is locked to shaft 20, it effects a definite gear ratio in the reverse direction and similar rotation of shaft 20.

In operation, if power is applied to the shaft 1 at any low speed, for instance the idling speed of a conventional automobile engine, and which is not sufficient to cause the ring or wheel 4 to prevent arms 7 from swivelling ring 4, and if the power is not sufficient to move the load on shaft 20, shaft 3 will rotate on its axis, and the pinion 10 will climb back on gear 23. No power, however, is transmitted to the driven shaft 20. Thus is produced a condition equivalent to the out-of-engagement position of the conventional automobile clutch.

If, now, the speed of the motor shaft 1 is increased, the correspondingly increased centrifugal force in the weighted ring 4 tends, during period A, to prevent arms 7 from swivelling ring 4 about arms 5 and to prevent thereby the auxiliary shaft 3 and gear 10 from rotating freely on their common axis. The effect of this tendency will vary between complete stoppage of the swivelling of ring 4 about arms 5 and retardation of said swivelling, and similarly between complete stoppage of the rotation of shaft 3 and gear 10 about their common axis, and retardation of said rotation. To the extent to which this retardation or restraint of rotation about their common axis of shaft 3 and gear 10 obtains, there will be a partial locking of the gears 10 and 23, and there will be set up a composite motion of shaft 3 and gear 10, which will consist of rotation of shaft 3 and gear 10 about their common axis, and also rotation as a crank about the axis of the driven shaft 20, to which they are connected by gear 23, in the direction of the rotation of the auxiliary shaft 3 and driving shaft 1, or clockwise.

The extent of this partial or complete locking of the gears 10 and 23 and their consequent rotation is dependent upon the relation between the power requirement of the automobile, or the load on the shaft 20, and the centrifugal force and inertia developed in the weighted ring 4 at any given instant. At any speed of the shaft 1 sufficient to cause a partial locking of the gears 10 and 23, the driven shaft 20 is caused to rotate clockwise at such speed as will balance the several forces resident in the driving mechanism as a whole.

With increased R. P. M. and a complete locking of the gears 10 and 23, which condition will obtain when the centrifugal tendency in the ring 4 and other joint elements is sufficient to completely prevent the swivelling of ring 4 about arms 5 by arms 7, rotation of the driven shaft 20 by the shaft 3 and gear 10 rotating as a crank becomes synchronous with the rotation of the shaft 1.

If it is desired to effect a fixed gear ratio between the shafts 1 and 20, this can be done by applying the brake 19 and the shoe 19A to stop the rotation of the disk 16, thus permitting only the rotation of the shaft 3 and gear 10 about their common axis, and causing them to rotate the shaft 20 about its axis. In such case, the centrifugal force in the ring 4 is overcome by the positive positioning of the bearing 16, and the ring 4 swivels on the arms 5 to permit the rotation of shaft 3 on its axis.

If it is desired to reverse the direction of fixed gear ratio rotation of shaft 20, the gear 24 is locked to the shaft 20 by throwing the clutch 22 inwardly to engage said gear (dotted lines, Fig. 1), releasing gear 23, and then applying the brake 19 to the disk 16, as described, thus preventing the disk, shaft 3 and gear 10 from rotating about the axis of the shaft 20. Gear 10 will then rotate about its own axis with shaft 3, and cause gear 24 and shaft 20 to rotate in the opposite or contra-clockwise direction to that of shaft 1.

As it is only necessary or desirable to provide a reverse gear 24 when reverse drive is or may be desired, applicants' invention is broadly shown and comprised in the means for direct drive only.

If preferred, Fig. 4, the necessary weight or load for the ring 4 may be incorporated therein or thereon, in the form of a plurality of balls or lugs 25 distributed evenly over the circumference of the ring to insure balance thereof, or, as in Fig. 4, preferably opposite the ends of arms 7. Obviously, with a selected or given weighting of the ring 4 in relation to the horsepower to be transmitted by the mechanism, a variable speed ratio of infinite range will be automatically obtained, depending upon the speed of the shaft 1, and consequent centrifugal force in the ring 4.

For the purpose of developing centrifugal force or influence in the ring 4 or its equivalent, all material on or near the outer circumferential surface of the ring 4 is much more effective than at any other location, and further, the nearer such material or mass is to the point on the circumference which, on tilting of the ring 4, will be brought nearest the shaft 1, the more effective such mass will be.

Hence, by positioning such mass opposite the ends of the arms 7 which are 90° from the arms 5, and herein when ring 4 is swiveled, nearest the center of rotation, i. e., axis of shaft, full benefit can be obtained for the building up of centrifugal force for use as a controlling influence for the control of the shaft 3 and gears 10 and 23, and hence of the driving mechanism.

Our invention is not limited to the precise construction shown herein, but may be modified in many details, without departing from the spirit of the claims, and within the scope thereof.

We claim:

1. Driving means comprising a drive shaft, and a driven shaft, in combination with means for driving the latter by the former at an automatically variable speed, the latter means comprising an auxiliary shaft universally connected to the drive shaft and connected to the driven shaft, and rotatable on its own axis at different speed ratios from the driven shaft and swingable simultaneously about the axis of the driven shaft.

2. Driving means comprising a drive shaft, and a driven shaft, in combination with means for driving the latter by the former at a variable speed, the latter means comprising an auxiliary shaft universally connected with the drive shaft and connected to the driven shaft, and a freely rotatable bearing carrying the auxiliary shaft between said drive and driven shafts, the auxiliary shaft rotatable on its own axis and swingable in either direction about the axis of the driven shaft in variable speed ratio to the drive and driven shafts.

3. Driving means comprising a drive shaft and a driven shaft, in combination with means for driving the latter by the former at selected speed, the latter means comprising an auxiliary shaft universally connected with the drive shaft, one member of the connection comprising radial arms on the drive shaft, and a ring pivotally mounted on the arms, and connected to the driven shaft, and a freely rotatable, disk-like bearing for the auxiliary shaft between said drive and driven shafts, the auxiliary shaft rotatable on its own axis and swingable in varying speed ratios to its own axial rotation about the axis of the driven shaft.

4. Driving means comprising a drive shaft and a driven shaft, in combination with means for driving the latter by the former at variable speed, said latter means comprising an auxiliary shaft universally connected with the drive shaft and connected to the driven shaft, and a balanced-disk-like bearing for the auxiliary shaft rotatable with the auxiliary shaft and supported between said driven and drive shafts, the auxiliary shaft rotatable on its own axis and swingable about the axis of the driven shaft.

5. Driving means comprising a drive shaft, a driven shaft, means for driving at variable speed the latter by the former, said latter means comprising an auxiliary shaft universally connected to the drive shaft and having a geared connection with the driven shaft, and including a rotatable bearing for the auxiliary shaft and brake for the bearing for controlling the rotation of the auxiliary shaft on its own axis.

6. Driving means comprising a drive shaft, a driven shaft, means for driving at variable speed the latter by the former, said latter means comprising an auxiliary shaft, a universal point connecting the auxiliary shaft to the drive shaft, the auxiliary shaft having a geared connection with the driven shaft, a movable bearing for the auxiliary shaft, and means comprising a loaded universal joint ring on the drive shaft for modifying the swinging of the auxiliary shaft and rotation of the driven shaft.

7. Driving means comprising a drive shaft, a driven shaft, means for driving at variable speed the latter by the former comprising an auxiliary shaft, a universal joint comprising a loaded ring connecting it to the drive shaft, the auxiliary shaft having a geared connection with the driven shaft, a movable bearing for the auxiliary shaft, and a brake for the movable bearing for effecting the rotation on its axis of the auxiliary shaft and driven shaft.

8. Means for effecting the driving of a driven shaft by a drive shaft, comprising a gear on the driven shaft, a universal joint on the drive shaft and means connecting said joint with the gear on the driven shaft, said latter means comprising an auxiliary shaft and a pinion fast thereon positioned at an angle to the drive shaft and responsive to the speed of the drive shaft to drive by rotation of the auxiliary shaft on its axis.

9. Means for effecting the driving of a driven shaft by a drive shaft, comprising a gear on the driven shaft, a universal joint on the drive shaft and means connecting said joint with the gear on the driven shaft, said latter means comprising an auxiliary shaft and a pinion fast thereon positioned at an angle to the drive shaft and responsive to the speed of the drive shaft to drive by rotation of the auxiliary shaft about the driven shaft.

10. Means for effecting the driving of a driven shaft by a drive shaft, comprising a gear on the driven shaft, a universal joint on the drive shaft and means connecting said joint with the gear on the driven shaft, said latter means comprising an auxiliary shaft and a pinion fast thereon positioned at an angle to the drive shaft and responsive to the speed of the drive shaft to drive by rotation of the auxiliary shaft on its axis and about the driven shaft.

11. Means for effecting the driving of a driven shaft by a drive shaft comprising a gear on the driven shaft, a universal joint on the drive shaft, means connecting said joint with the gear on the driven shaft, said latter means comprising a movable bearing between said joint and shaft, a brake therefor, and an auxiliary shaft with a pinion fast thereon positioned at an angle to the drive shaft and responsive to the speed of the drive shaft to drive by rotation of the auxiliary shaft on its axis and about the driven shaft.

12. In driving means comprising a driven shaft, a gear thereon, a pinion in mesh therewith and an auxiliary shaft secured to said pinion, and means for automatically controlling the composite motion of said pinion about its own axis and around the axis of the driven shaft comprising a loaded universal joint secured to said auxiliary shaft, and a drive shaft therefor.

13. Driving connections for a drive and a driven shaft, said connections comprising a universal joint with a hub for the drive shaft and having radially pivoted thereto a ring; a second hub pivoted on said ring radially at an angle to the first hub, an auxiliary shaft rotatable with said second hub; a pinion on said shaft; a gear in mesh therewith and adapted to be connected to the driven shaft, whereby the centrifugal force in said joint at any given time proportionately influences the axial rotation of said auxiliary shaft, pinion and gear, and the swinging of said auxiliary shaft and pinion about the axis of the driven shaft.

14. Driving connections for a drive and a driven shaft, said connections comprising a universal joint with a hub for the drive shaft and having radially pivoted thereto a ring; a second hub pivoted on said ring radially at an angle to the first hub, an auxiliary shaft rotatable with said second hub; and a rotatable bearing for the auxiliary shaft; a pinion on said shaft, a gear in mesh therewith and adapted to be connected to the driven shaft, whereby the centrifugal force in said joint at any given time proportionately influences the axial rotation of said auxiliary shaft and pinion, and the swinging of said auxiliary shaft, pinion and gear about the axis of the driven shaft.

15. Driving connections for a drive and a driven shaft, said connections comprising a hub-like member to be secured to the drive shaft, a centrifugal force-creating member on the hub, and capable of pivoted movement thereon; an auxiliary shaft on said force-creating member and pivotally movable thereon and also axially movable therewith; teeth on the free end of said auxiliary shaft; and a gear in mesh with said teeth and adapted to be secured to a driven shaft to drive the same.

16. Driving connections for a drive and a driven shaft, said connections comprising a hub-like member to be secured to the drive shaft, a centrifugal force-building member on the hub, and capable of pivotal movement thereon; an auxiliary shaft on said force-building member and pivotally movable thereon and also axially movable therewith; and a movable bearing for said shaft; and teeth on the end of said auxiliary shaft; and a gear in mesh with said teeth and adapted to be secured to a driven shaft to drive the same.

JOHN S. SCHUMAKER.
ALAN G. SCHUMAKER.

CERTIFICATE OF CORRECTION.

Patent No. 2,026,999. January 7, 1936.

JOHN S. SCHUMAKER, ET AL.

It is hereby certified that error appears in the printed specification of the above numbered patent requiring correction as follows: Page 4, second column, line 27, claim 14, strike out the comma and insert instead the word and; same line and claim, strike out the words "and gear"; and that the said Letters Patent should be read with these corrections therein that the same may conform to the record of the case in the Patent Office.

Signed and sealed this 25th day of February, A. D. 1936.

Leslie Frazer (Seal)                      Acting Commissioner of Patents.